US012325114B2

(12) United States Patent
Baer et al.

(10) Patent No.: US 12,325,114 B2
(45) Date of Patent: Jun. 10, 2025

(54) FIBER HANDLING TOOL WITH SPRING LOADED DOORS

(71) Applicant: US Conec Ltd., Hickory, NC (US)

(72) Inventors: Kolton Baer, Hickory, NC (US); Mitchell Cloud, Hickory, NC (US); Darrell R. Childers, Hickory, NC (US); Jillcha F. Wakjira, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 250 days.

(21) Appl. No.: 18/161,634

(22) Filed: Jan. 30, 2023

(65) Prior Publication Data

US 2023/0173646 A1 Jun. 8, 2023

Related U.S. Application Data

(63) Continuation of application No. 16/920,351, filed on Jul. 2, 2020, now Pat. No. 11,565,378.

(60) Provisional application No. 62/869,890, filed on Jul. 2, 2019.

(51) Int. Cl.

| | |
|---|---|
| ***B25B 5/00*** | (2006.01) |
| ***B25B 5/04*** | (2006.01) |
| ***B25B 5/14*** | (2006.01) |

(52) U.S. Cl.
CPC . *B25B 5/14* (2013.01); *B25B 5/04* (2013.01)

(58) Field of Classification Search
CPC .. B25B 5/14; B25B 5/00; B25B 5/101; B25B 5/082; B25B 5/125
See application file for complete search history.

(56) References Cited

U.S. PATENT DOCUMENTS

| | | | | |
|---|---|---|---|---|
| 4,379,771 | A * | 4/1983 | Snyder | B29C 70/74 249/91 |
| 5,151,964 | A | 9/1992 | Carpenter et al. | |
| 5,207,857 | A | 5/1993 | Tanabe et al. | |
| 5,524,167 | A | 6/1996 | Ewert et al. | |
| 5,950,998 | A * | 9/1999 | Crabb | B25B 5/101 269/98 |
| 6,033,124 | A | 3/2000 | Lesueur et al. | |
| 6,439,780 | B1 | 8/2002 | Mudd et al. | |
| 7,438,485 | B2 | 10/2008 | Tabata et al. | |
| 7,546,020 | B2 | 6/2009 | Honma | |
| 7,848,609 | B2 | 12/2010 | Meitzler | |
| 7,901,147 | B1 | 3/2011 | Jong et al. | |
| 7,934,874 | B2 | 5/2011 | Honma et al. | |
| 8,052,334 | B2 | 11/2011 | Childers et al. | |
| 8,485,735 | B2 | 7/2013 | Childers et al. | |
| 8,826,517 | B2 | 9/2014 | Leyva et al. | |
| 8,861,920 | B2 | 10/2014 | Sato et al. | |

(Continued)

FOREIGN PATENT DOCUMENTS

| | | |
|---|---|---|
| KR | 101794610 B1 | 11/2017 |

*Primary Examiner* — Lee D Wilson
(74) *Attorney, Agent, or Firm* — Michael L. Leetzow PLLC; Shubhrangshu Sengupta

(57) ABSTRACT

A fiber handling tool has a cover to engage optical fibers placed in the fiber handling tool. There may be more than one cover and the covers have at least two elastic elements. There are at least two elastic elements that cooperate to hold the optical fibers and/or cable in place and another elastic element may be used with a door lock that is rotatably attached to the cover. There are also structures for managing the routing of the optical fibers within the tool.

20 Claims, 22 Drawing Sheets

(56) References Cited

U.S. PATENT DOCUMENTS

| | | | | |
|---|---|---|---|---|
| 9,004,781 | B2 | 4/2015 | Homma et al. | |
| 9,151,896 | B2 | 10/2015 | Nguyen et al. | |
| 9,235,005 | B2 | 1/2016 | Sato et al. | |
| 9,541,710 | B2 | 1/2017 | Sasaki et al. | |
| 9,678,281 | B2 | 6/2017 | Childers et al. | |
| 9,720,185 | B2 | 8/2017 | Halls et al. | |
| 10,151,884 | B2 | 12/2018 | Childers et al. | |
| 10,585,244 | B2 | 3/2020 | Mori et al. | |
| 10,921,527 | B2 | 2/2021 | Sato et al. | |
| 2002/0130152 | A1 | 9/2002 | Cripps | |
| 2003/0113071 | A1* | 6/2003 | Kim | G02B 6/4249 385/76 |
| 2006/0108729 | A1* | 5/2006 | Siegel | B25B 1/2421 269/266 |
| 2012/0328251 | A1 | 12/2012 | Takeuchi et al. | |
| 2013/0243385 | A1 | 9/2013 | Nguyen et al. | |
| 2014/0299645 | A1 | 10/2014 | Lurie et al. | |
| 2015/0023629 | A1* | 1/2015 | Davis | G02B 6/2706 385/11 |
| 2015/0071598 | A1* | 3/2015 | Badura | G02B 6/44775 385/135 |
| 2018/0074261 | A1 | 3/2018 | Burek et al. | |
| 2018/0284353 | A1 | 10/2018 | Zhao | |

* cited by examiner

FIBER HANDLING TOOL WITH SPRING LOADED DOORS

REFERENCE TO RELATED CASE

This application claims priority under 35 U.S.C. § 119 (e) to provisional application No. 62/869,890 filed on Jul. 2, 2019, the contents of which are hereby incorporated by reference in their entirety.

BACKGROUND OF THE INVENTION

Field of the Invention

Many times there is a need to ribbonize optical fibers and to terminate the optical fibers by securing a fiber optic ferrule to the ends of the optical fibers. There are procedures for holding, ribbonizing, and terminating the optical fibers, sometimes depending on the apparatus used to hold the optical fibers while ribbonizing and terminating the optical fibers. The apparatus used may be a ribbonizing tool or a fiber handler. Some of these devices are illustrated and explained in Applicant's prior patents, which include U.S. Pat. Nos. 9,151,896; 9,678,281; 10,151,884; 10,162,122; 9,128,214; and 8,485,735.

Different manufacturers have different ways/tools for ribbonizing optical fibers, hence customers need to be retrained whenever they switch equipment. There is a tendency for fiber arrays to slip during ribbonization, making the ribbonization unwieldy. Generally, ribbonization is a difficult and cumbersome manual process, as well as being expensive (both in labor and materials). More often than not, the technician handling these tools has to, at least for part of the fiber termination process, use both hands to manage the fibers, or tape the tool to a workbench. In certain designs, the fiber handlers use elastomer molded pads to compress and hold the fiber optic ribbons and the optical fibers. These pads tend to wear out causing slippage of the optical fibers underneath.

It is beneficial if the tool were simple to use so that retraining were not required and also allowed for use by only one hand, freeing up the other to work on the optical fibers, rather than have to request help from someone else or using tape to manage the optical fibers.

SUMMARY OF THE INVENTION

The present invention is directed to a fiber handling tool for holding optical fibers relative to one another for preparation that includes a cable holding portion, the cable holding portion having a channel therein to receive a fiber optic cable having optical fibers disposed therein, an optical fiber holding portion, the optical fiber holding portion having an optical fiber groove for a single row of optical fibers from the fiber optic cable, a first cover associated with the cable holding portion and having at least two elastic members on an underside thereof, a first of the at least two elastic members to engage a fiber optic cable disposed in the channel of the cable holding portion when the first cover is closed, and a second of the at least two elastic members to bias the first of the at least two elastic portions towards the fiber optic cable, and a second cover associated with the optical fiber holding portion and having at least two elastic members on an underside thereof, a first of the at least two elastic members to engage optical fibers disposed in the optical fiber holding portion when the second cover is closed, and a second of the at least two elastic members to bias the first of the at least two elastic members towards the optical fibers.

In some embodiments, the first cover has a main body, the main body has a door lock rotatably attached thereto, the door lock biased relative to the main body of the first cover by a third elastic member, and wherein the second cover has a main body, the main body has a door lock rotatably attached thereto, the door lock biased relative to the main body of the second cover by a third elastic member.

In some embodiments, the cable holding portion and the optical fiber holding portion are on a base, the first cover and the second cover are rotatably attached to the base.

In other embodiments, the main body of the first cover has a rear portion to engage the cable holding portion, a front pocket to receive the door lock, and a cavity disposed between the rear portion and the front pocket, the cavity to receive the at least two elastic members, and the main body of the second cover has a rear portion to engage the optical fiber holding portion, a front pocket to receive the door lock, and a cavity disposed between the rear portion and the front pocket, the cavity to receive the at least two elastic members.

In some embodiments, there is also a fiber stacker removable attached to the base at the optical fiber holding portion.

According to another aspect of the present invention, there is a fiber handling tool for holding optical fibers relative to one another for preparation that includes a base having a cable holding portion and an optical fiber holding portion, the cable holding portion having a channel therein to receive a fiber optic cable and the optical fiber holding portion having an optical fiber groove for a single row of optical fibers from the fiber optic cable, a first cover associated with the cable holding portion, the first cover further comprising a door lid rotatably connected to the base and a two-piece door lid latch to secure the first cover to the base, and a second cover associated with the optical fiber holding portion, the second cover further comprising a door lid rotatably connected to the base and a two-piece door lid latch to secure the second cover to the base.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
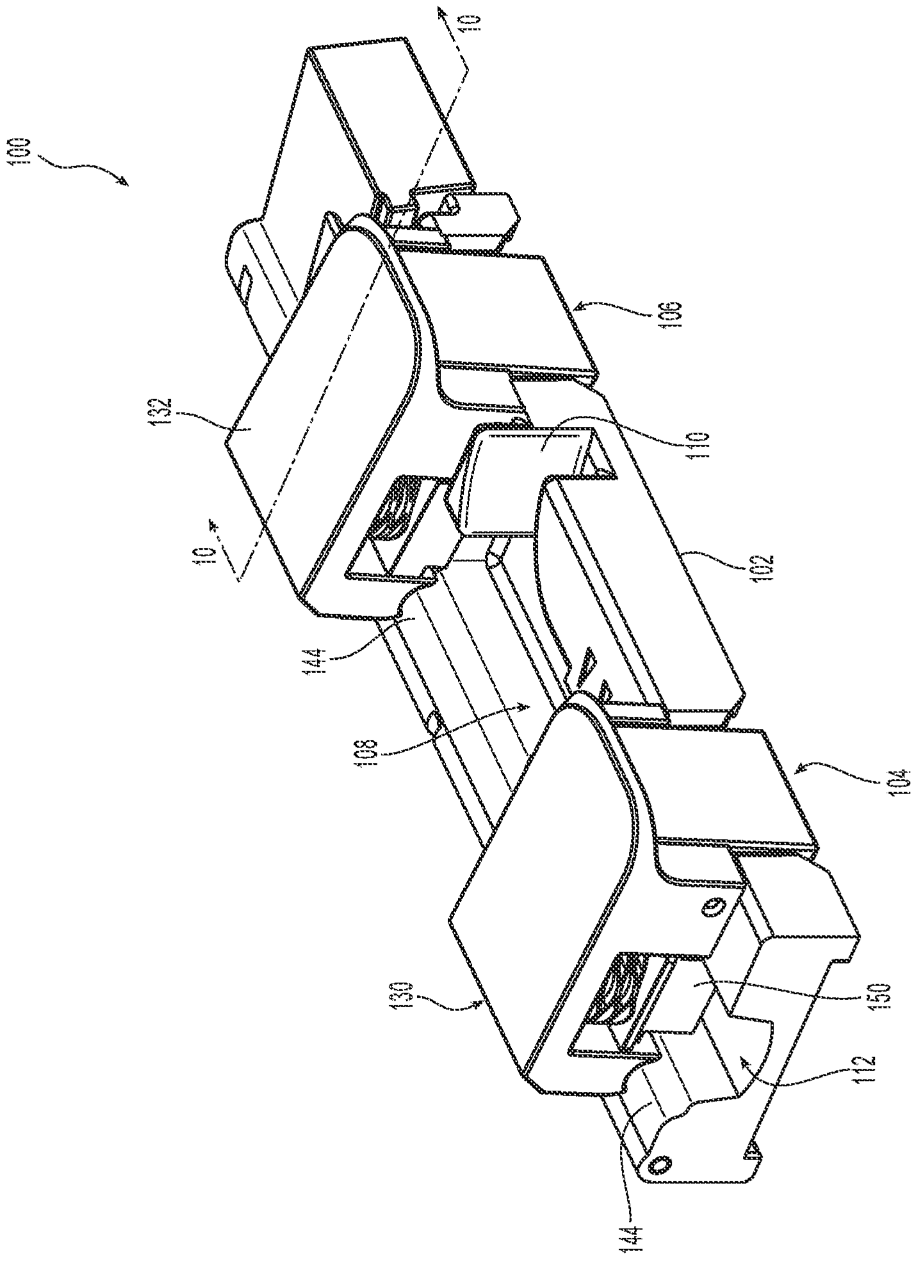
FIG. 1 is a perspective view from one side of one embodiment of a fiber handling tool according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-4, there is a fiber handling tool 100 for holding optical fibers (not shown for clarity) relative to one another for preparation. The preparation may be for ribbonizing the optical fibers or for terminating the optical fibers with a fiber optic connector. The fiber handling tool 100 has a base 102 that includes a first portion 104 and a second portion 106. In one embodiment, the first portion 104 corresponds to a cable holding portion and the second portion 106 corresponds to an optical fiber holding portion. There may be a portion disposed between the first portion 104 and the second portion 106. For example, there may be a pocket 108 that separates the first portion 104 and the second portion 106. The pocket 108 may be used to accommodate objects that are used to terminate the optical fibers. For example, the pocket 108 could be used to hold a connector spring that must be placed over the optical fibers before the optical fibers are terminated. The pocket 108 may be of a different configuration, including the size, depth, and/or shape than that illustrated herein.

Figure 2:
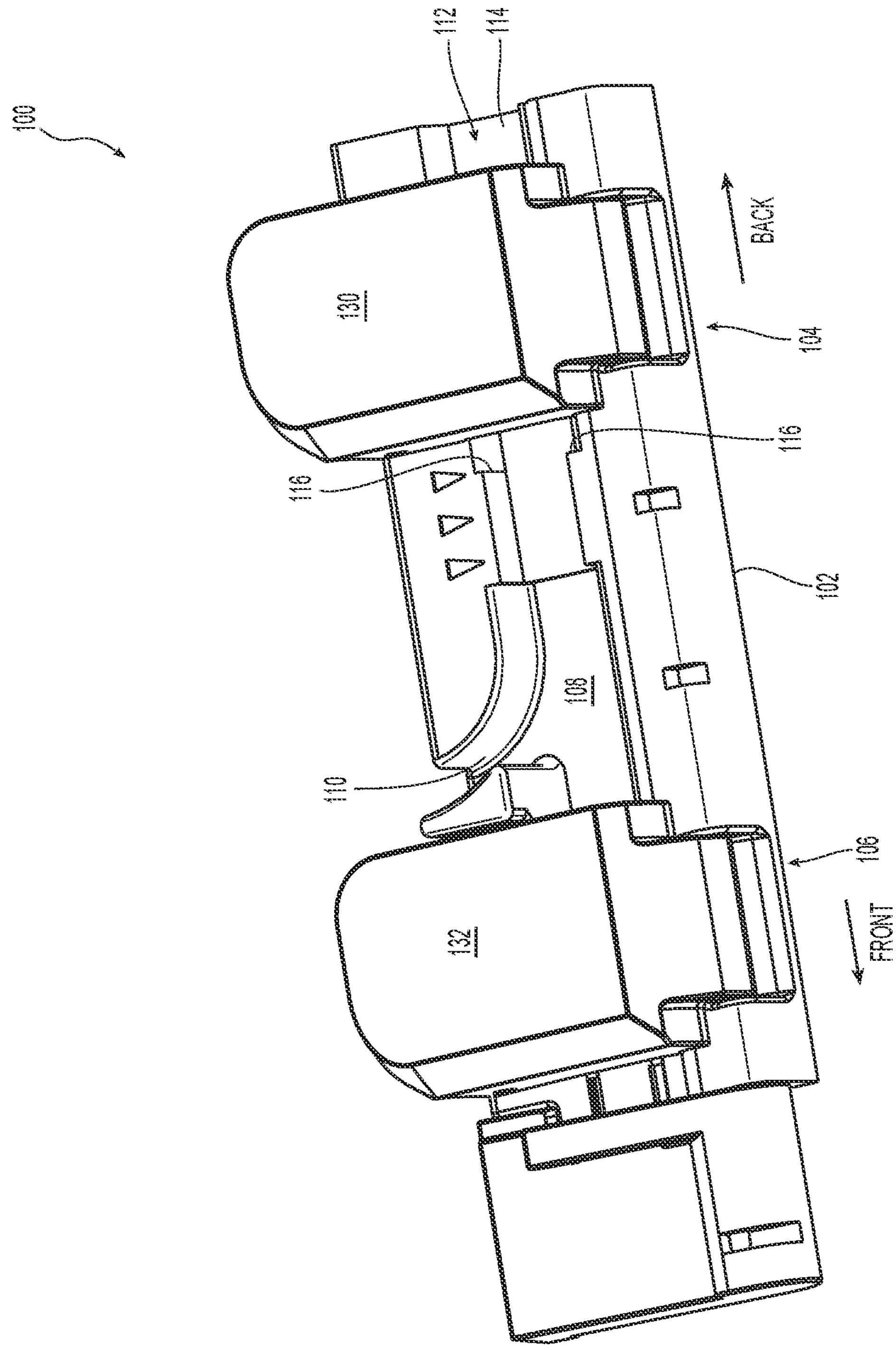
FIG. 2 is a perspective view from the top of the fiber handling tool of FIG. 1.
Figure 3:
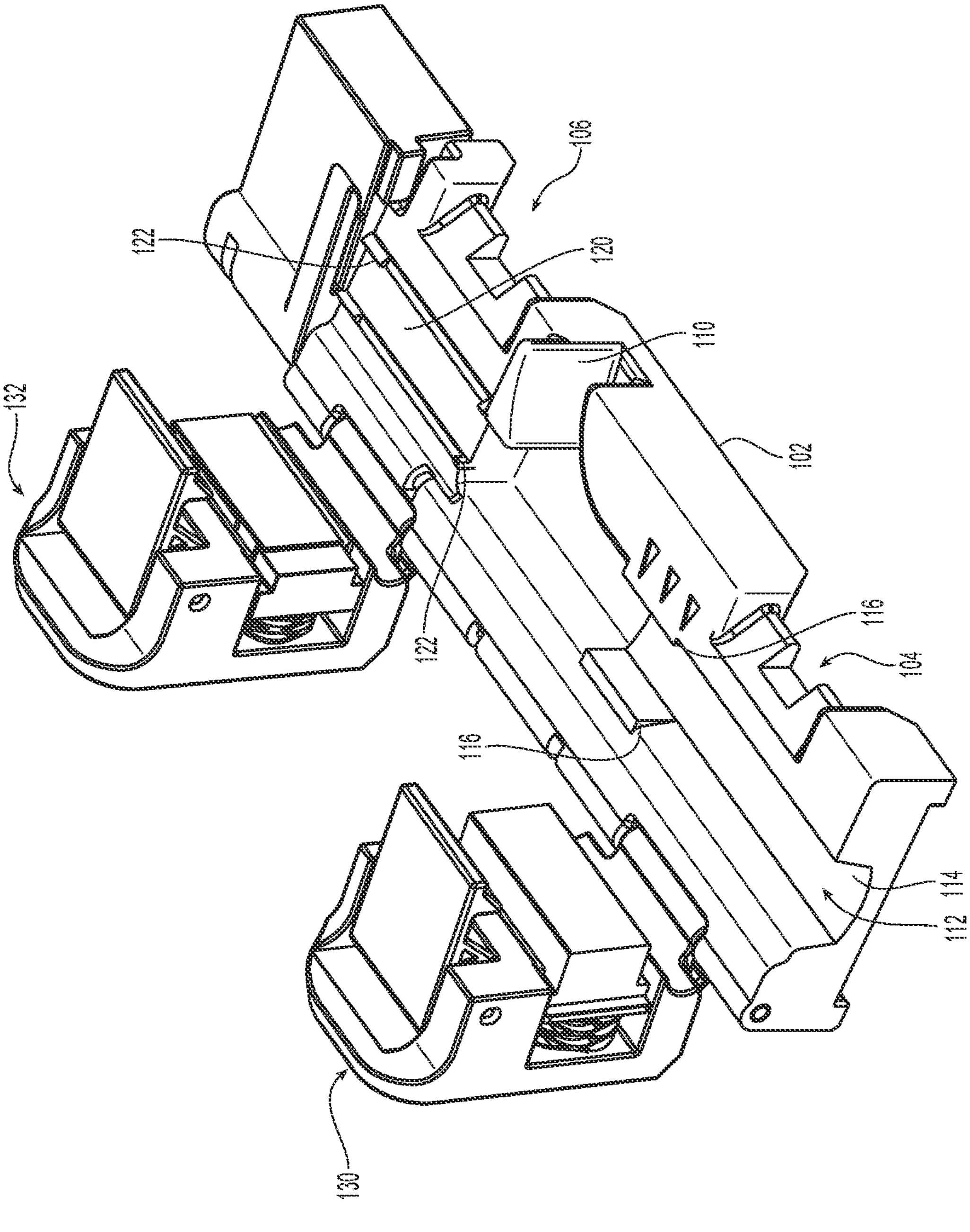
FIG. 3 is a perspective view from the back of the fiber handling tool of FIG. 1 with the covers in an open position.
Figure 15:
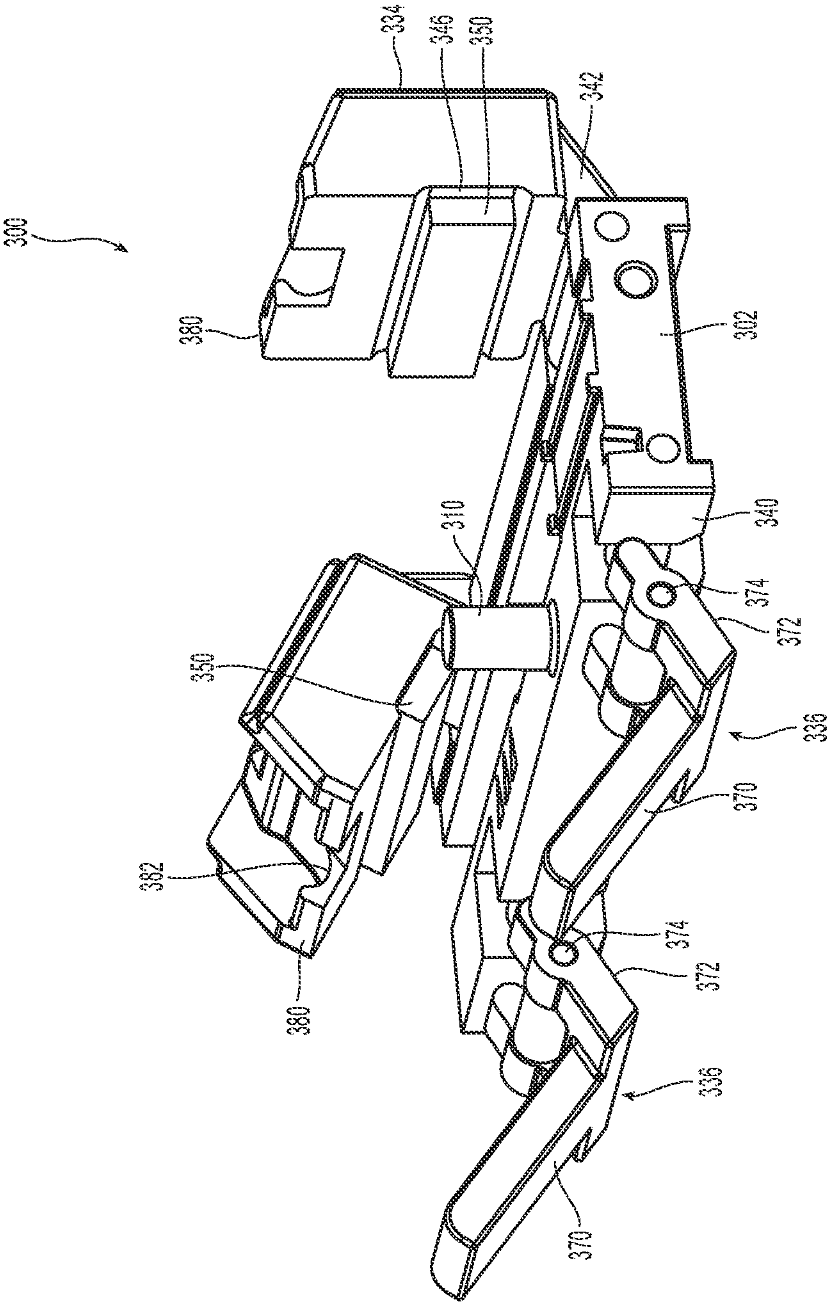
FIG. 15 is a perspective view from the front right corner of a second embodiment of a fiber handling tool according to the present invention.
Figure 16:
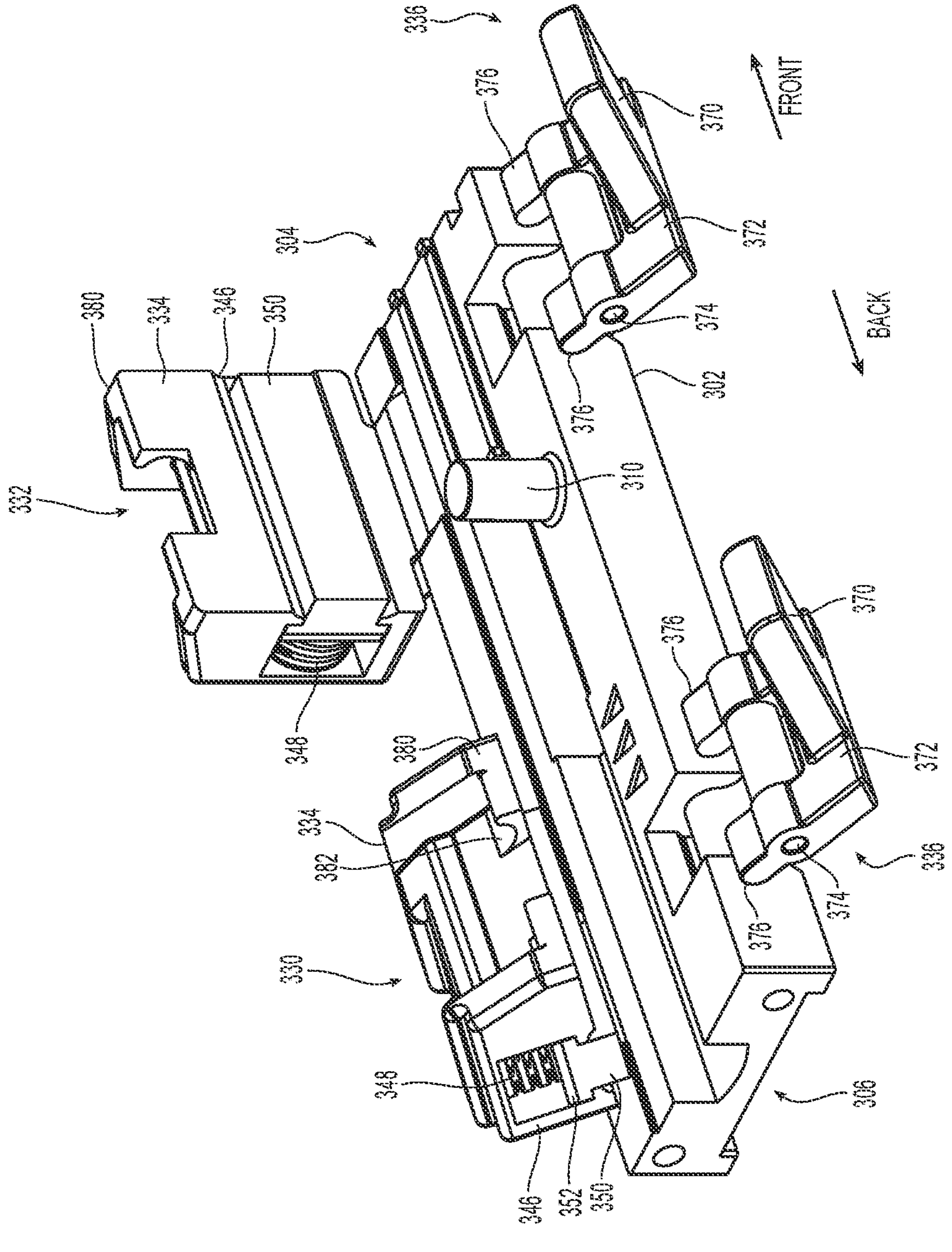
FIG. 16 is a perspective view from the back right corner of the fiber handling tool of FIG. 15 with the covers open.
Figure 17:
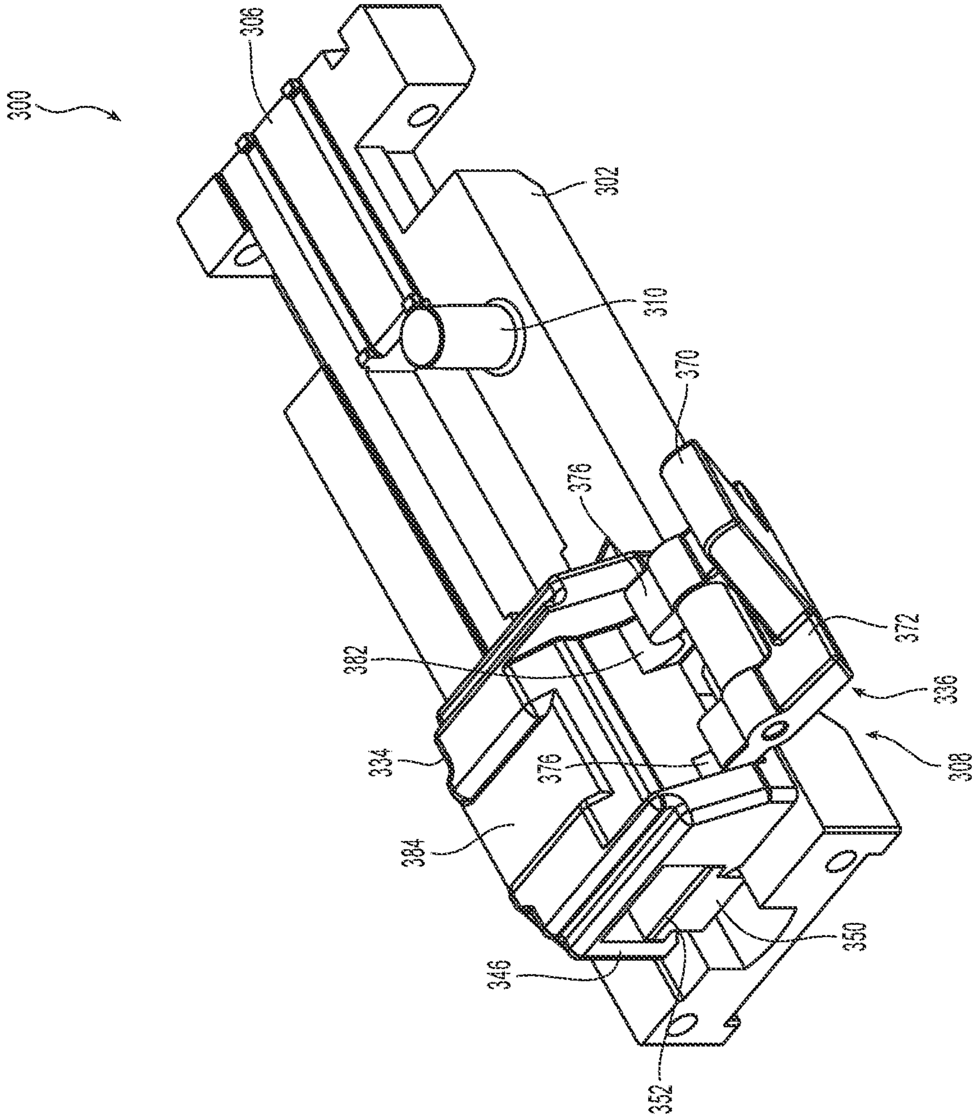
FIG. 17 is a perspective view from the right side of the fiber handling tool of FIG. 15 with one of the covers partially open.
Figure 19:
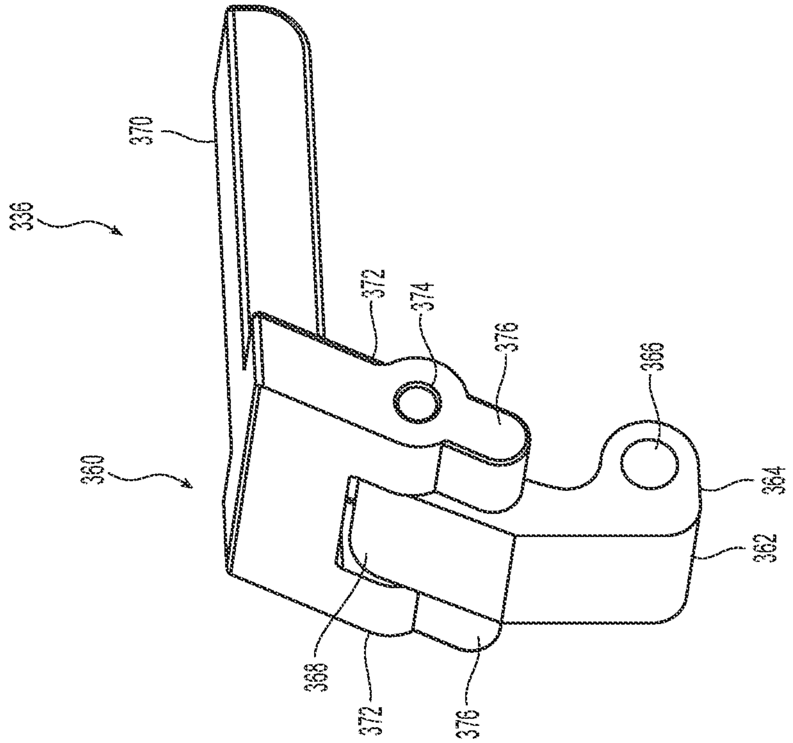
FIG. 19 is a perspective view of the lever arm in FIG. 21 with a base piece for the fiber handling tool of FIG. 15.
Figure 18:
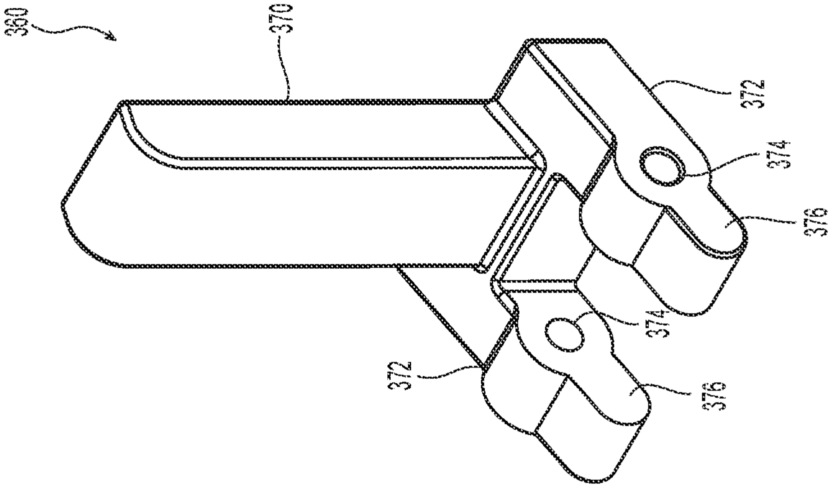
FIG. 18 is a perspective view of one lever arm for the cover of the fiber handling tool of FIG. 15.

The base 102 may also have some optical fiber management structures that assist in keeping optical fibers that are not being terminated/ribbonized out of the way. In the embodiment in FIGS. 1-4, there is a pathway 110 between the first portion 104 and the second portion 106 that allows for the optical fibers to be routed out of base 102 before reaching the second portion 106. The pathway 110 is best seen in FIGS. 2 and 3. The optical fibers that are routed through the first portion 104 can be routed in the pathway 110 before they reach the second portion 106. Naturally, pathway 110 would be used to manage those optical fibers that are not being terminated/ribbonized. The fiber management structures may also include other structures and not be limited to a curved trough in the base 102. As but one example, there may be posts against which the optical fibers can be routed. See, e.g., FIG. 15 and discussion below.

The first portion 104 (cable holding portion) of the fiber handling tool 100 may be used with a fiber optic cable (not shown) which has a generally tubular outer jacket. The first portion 104 has a channel 112 that is configured to receive a fiber optic cable having optical fibers disposed therein. Preferably the channel 112 has a bottom 114 that is curved to better accommodate the fiber optic cable. The radius of the curved bottom 114 may vary depending on the needs of the user. However, curved bottom 114 is designed to accommodate a wide range of cable diameters (about 1.6 mm-3.8 mm). Disposed within the channel 112 may be a cable jacket stop 116 to engage the fiber optic cable's jacket and prevent the fiber optic cable from traveling too far toward the second portion 106. As illustrated best in FIG. 2, there may be a cable jacket stop 116 on both sides of the channel 112. When the fiber optic cable is inserted into the fiber handling tool 100, it would be pushed (or pulled) toward the second portion 106 and the fiber optic cable would engage the cable jacket stop 116 to prevent the fibers from being cut and stripped incorrectly.

Figure 4:
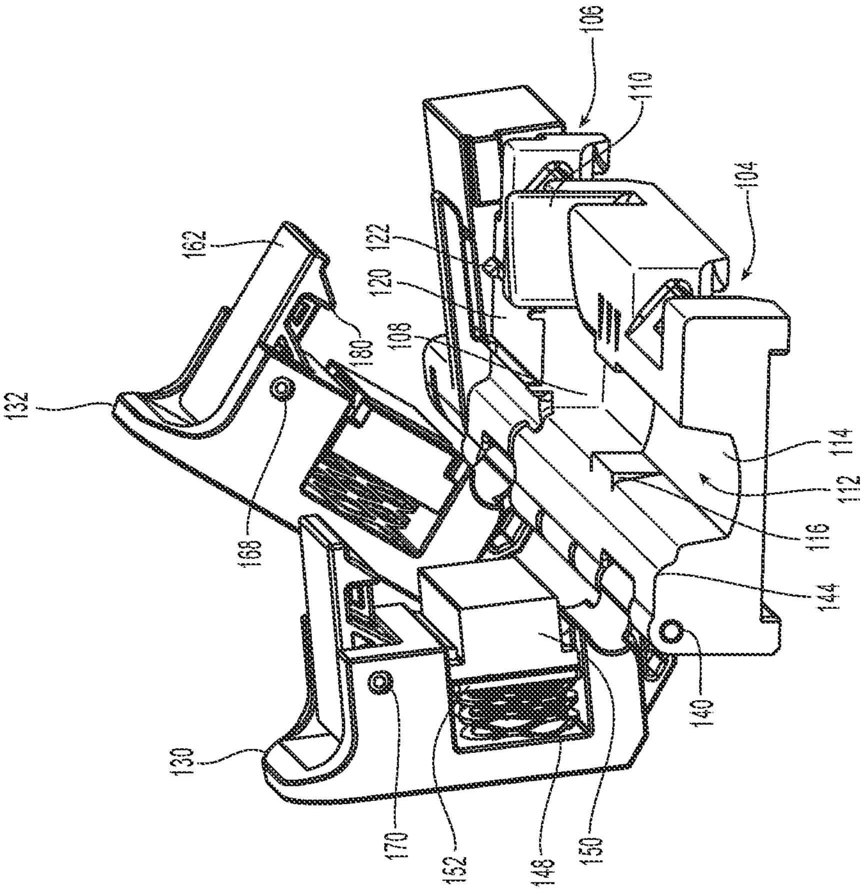
FIG. 4 is a perspective view from the back of the fiber handling tool of FIG. 1 with the covers in an open position.
Figure 6:
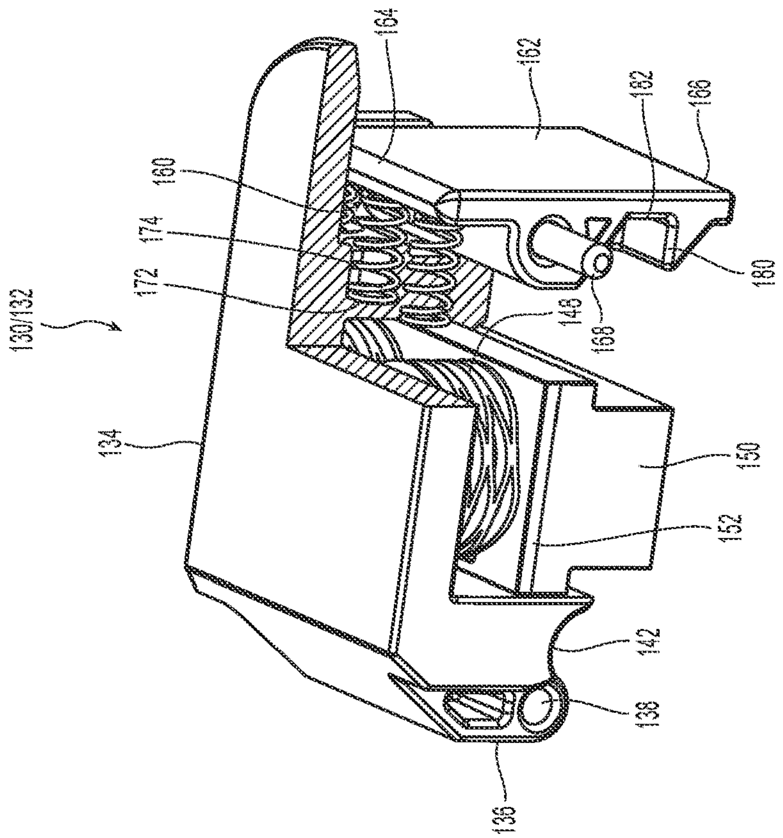
FIG. 6 is a perspective cross section view of the cover in FIG. 5.

The second portion 106 (optical fiber holding portion) of the fiber handling tool 100 is used to arrange the optical fibers from the fiber optic cable. It should be noted that as used herein the first portion 104 is at the back end of the fiber handling tool 100 and the second portion 106 is at the front end of the fiber handling tool 100. See FIG. 2. The second portion 106 having an optical fiber groove 120 for a single row of optical fibers from the fiber optic cable. Preferably, the optical fiber groove 120 is shallow so that only one row of optical fibers fits therein when the cover, as discuss below, engages the base 102. As with the first portion 104, the second portion 106 may also have structures that keep the optical fibers within the optical fiber groove 120. Such structures may take the form of posts 122 as illustrated in FIGS. 3 and 4. The posts 122 may be elongated and have configurations other than that illustrated in the figures so long as the posts assist in keeping the optical fibers within the optical fiber groove 120. For example, the posts 122 may extend along a length of the optical fiber groove 120 or even along the entire length thereof. They may also take different shapes as well.

The fiber handling tool 100 has a first cover 130 associated with the first portion (cable holding portion) 104. The first cover 130 is rotatably attached to the base 102. The fiber handling tool 100 also has a second cover 132 associated with the second portion (optical fiber holding portion) 106. The second cover 132 is also rotatably attached to the base 102.

The first cover 130 and the second cover 132 are preferably the same and have the same construction. Thus, only one of the covers 130/132 will be described in detail although the description is applicable to both. It should also be noted that although there are two covers 130/132, the two covers could be connected to function as a single element rather than as two separate elements.

Figure 5:
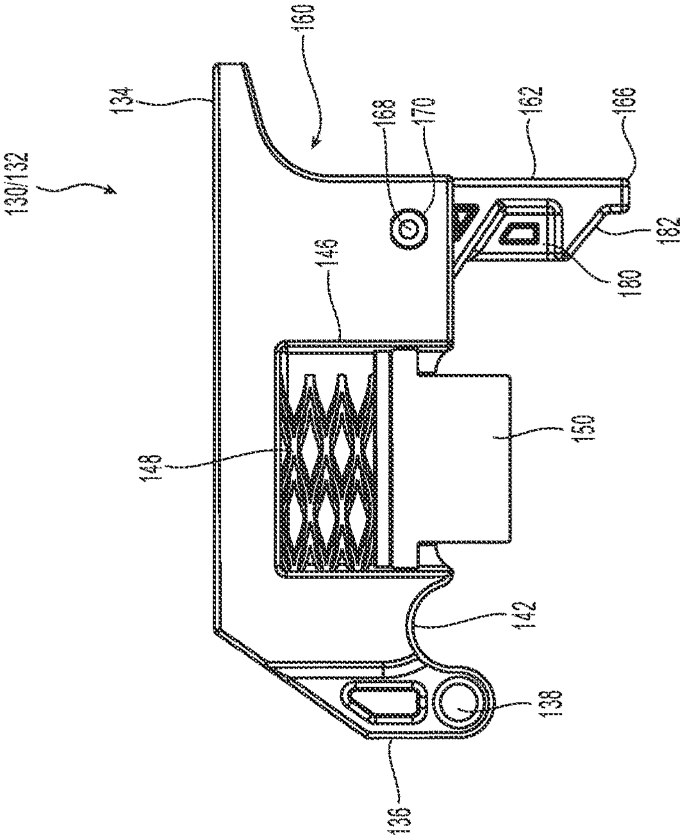
FIG. 5 is a side elevation view of one of the covers of the fiber handling tool of FIG. 1.
Figure 8:
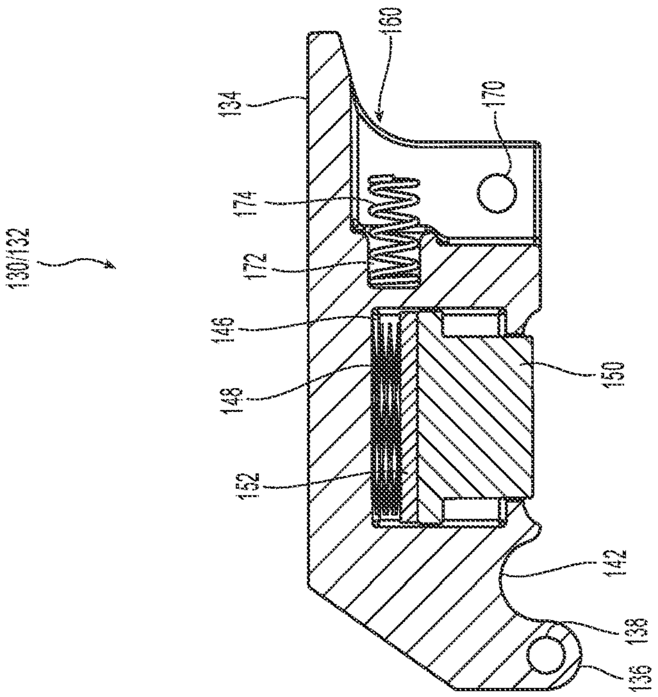
FIG. 8 is a cross section view of the cover in FIG. 7.
Figure 7:
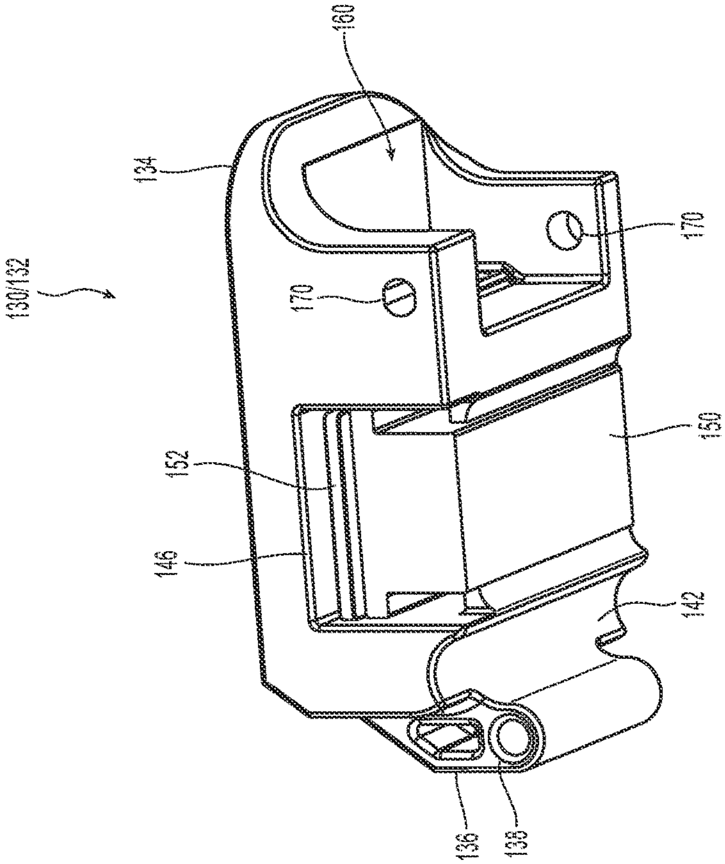
FIG. 7 is a perspective view from the bottom of the cover in FIG. 5 without the door lock.

The covers 130/132 have a main body 134 with a rear portion 136 to engage the base 102 in a rotatable manner. See FIG. 5. There is an opening 138 in the rear portion 136 to receive a pin 140 that is present in the base 102 to connect the covers 130/132 rotatably to the base 102. Immediately forward of the rear portion 136 is a rounded portion 142 to receive a rounded portion 144 that extends along the base 102. The combination of the rounded portion 142 with the rounded portion 144 on the base 102 assists in stability of the fiber handling tool 100 when the covers 130/132 are closed.

In front of the rear portion 136 is a cavity 146 to receive at least two elastic members 148,150. The cavity 146 is illustrated in the figures to have a rectangular shape, but can be of any appropriate configuration and/or shape. Disposed inside the cavity 146 is the first elastic member 148. The first elastic member 148 is illustrated to be a conical spring, but could be any appropriate type. The first elastic member 148 could be made of any appropriate material. The second elastic member 150 is preferably an elastomeric or rubber pad. The first elastic member 148 biases the second elastic number 150 onto the first and second portions 104,106 to hold the fiber-optic cable and the optical fibers, respectively, in position. Further, the presence of the first elastic member 148 aids to avoid any creep that may occur in the material of the second elastic member 150 over time. It also provides a consistent force on the optical fibers underneath the second elastic member 150 for a longer period of time compared to conventional rubber pads that do not have any room to move relative to the cover 130. This configuration allows the position of the second elastic member 150 to move depending on how much of a reaction force the second elastic member 150 encounters from the fibers disposed on the base 102. This provides for optimal forces and avoids creation of grooves on the surface of the rubber pad that contacts the optical fibers.

Also illustrated in the figures (FIGS. 5-8 in particular) is a separator 152 that is disposed between the first elastic member 148 and the second elastic member 150. The separator 152 may be attached to either one or both of the elastic members 148, 150. Separator 152 assists in keeping the second elastic member 150 centered within the cavity 146. In one aspect, the separator 152 is optional. Further, the first elastic member 148 and the second elastic member 150 may be a single integrated piece, e.g., joined to each other. Alternatively, a leaf-spring-like structure that has a broad member directly contacting the optical fiber cables and/or the fiber ribbon may be used. The smallest of such a leaf spring will be inside the cavity 146.

The 130/132 have a front pocket 160 to receive a door lock 162. The front pocket 160 is disposed forward of the cavity 146 and on the opposite side of the cavity from the rear portion 136. The door lock 162 extends between a top portion 164 and a bottom portion 166. Between the top portion 164 and the bottom portion 166 is a pin 168 that engages an opening 170 on opposite sides of the covers 130/132. The pin 168 may be integral with the door lock 162 or it may be disposed within an opening in the door lock 162. Also present within the front pocket 160 are elastic member receptacles 172. These elastic member receptacles 172 receive third elastic members 174 that also engage the top portion 164 of the door lock 162. This configuration causes the third elastic members 174 to bias the door lock 162 about the pin 168 to hold the bottom portion 166 of the door lock 162 towards the main body 134. On the inside surface 182 of the door lock 162 at the bottom portion 166 is a projection 180 to engage the base 102, thereby keeping the covers 130/132 closed.

Figure 9:
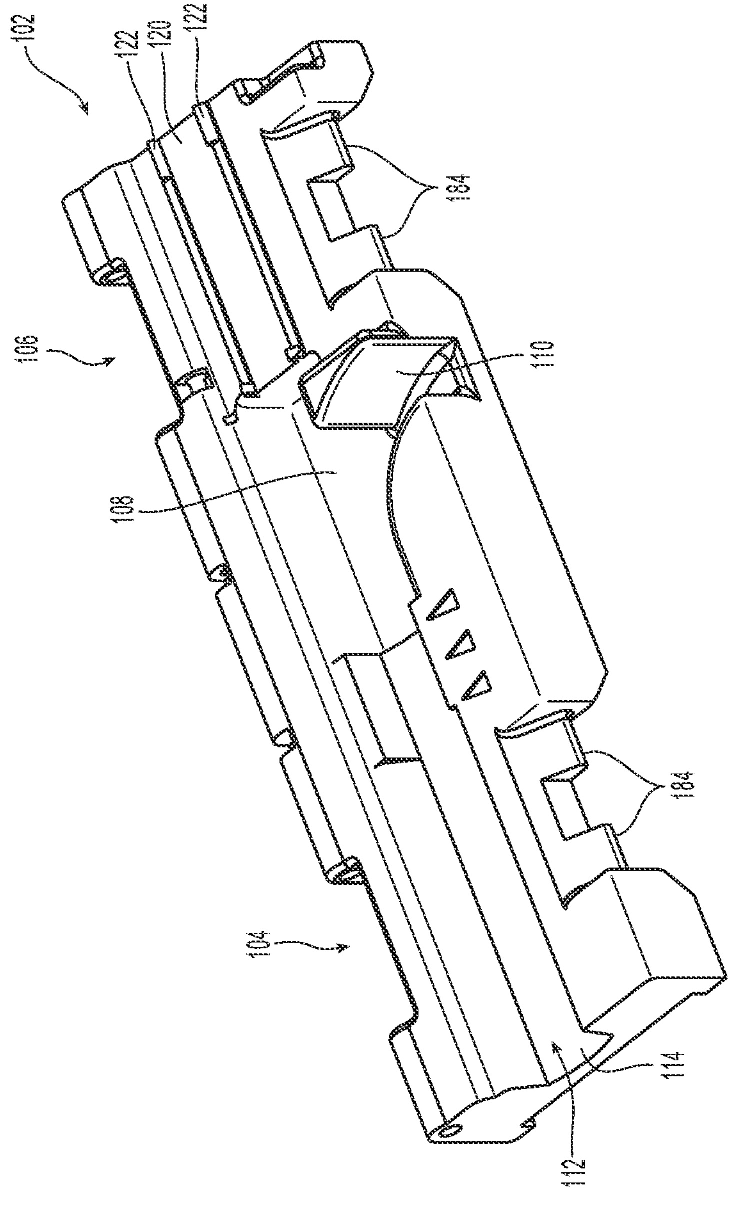
FIG. 9 is a perspective view of the base of the fiber handling tool of FIG. 1 with the covers removed.
Figure 14:
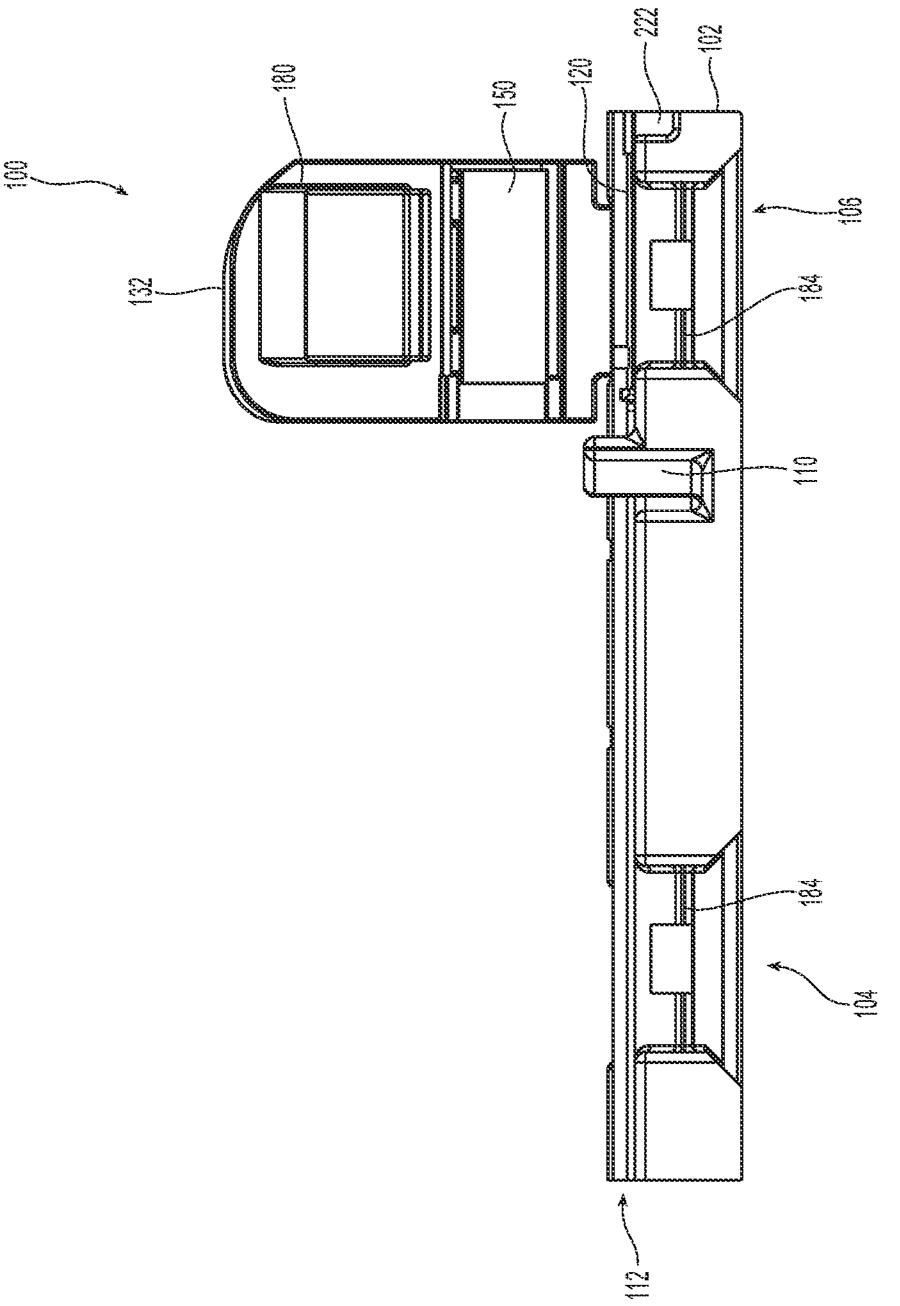
FIG. 14 is a side elevation view of the fiber handling tool of FIG. 1.

FIG. 9 illustrates the base 102 of the fiber handling tool 100 without the covers 130/132. The base 102 has at each of the first portion 104 and the second portion 106 areas 184 for engagement with the projection 180 of the door lock 162. Using the projection 180 and the areas 184, the covers 130/132 will stay in position and hold the fiber optic cable and the optical fibers in the fiber handling tool 100. See also FIG. 14.

Figure 10:
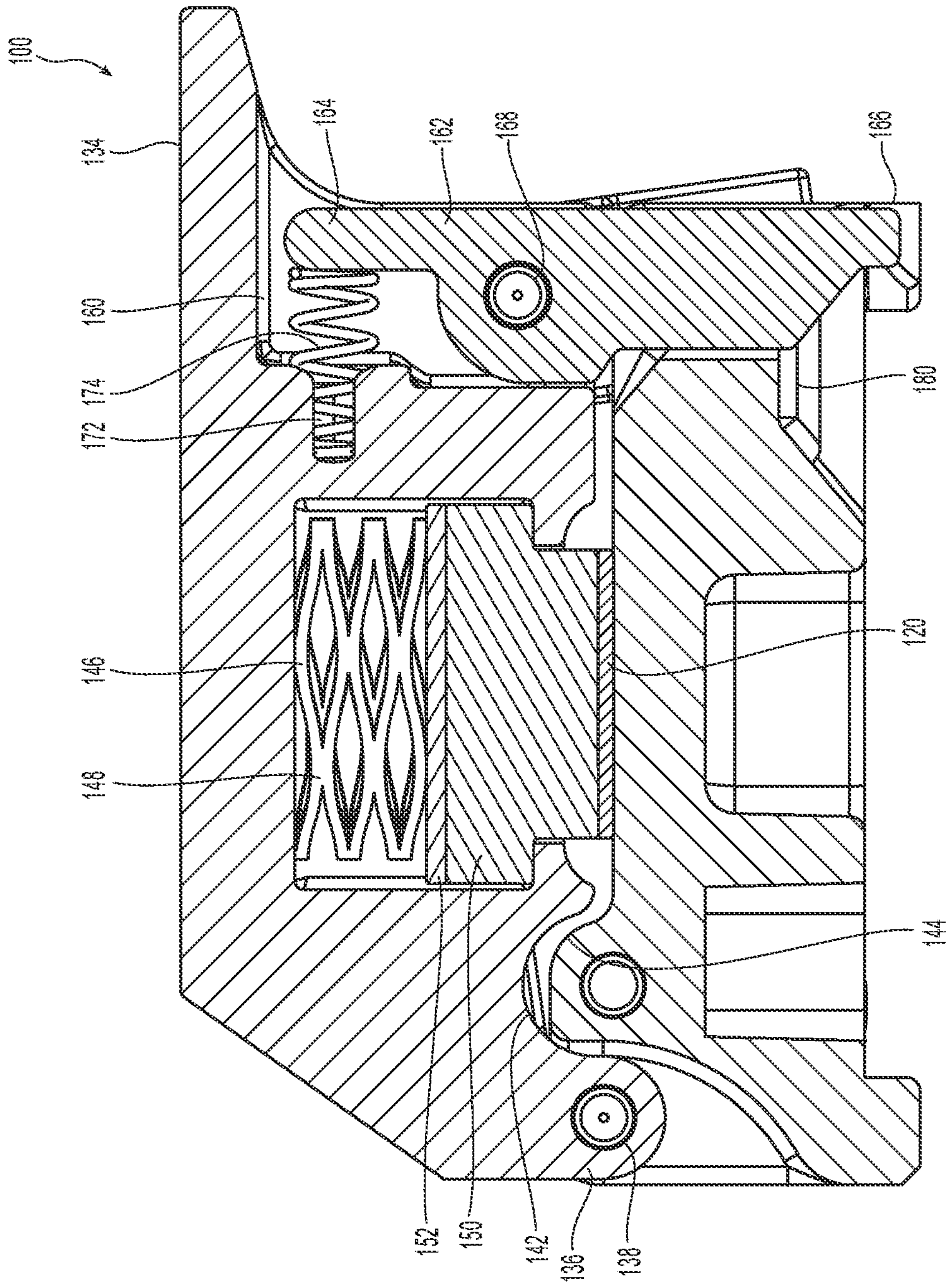
FIG. 10 is a cross section view of the fiber handling tool along the line 10-10 in FIG. 1.

A cross section of the fiber handling tool 100 through the second portion 106 is shown in FIG. 10.

Figure 11:
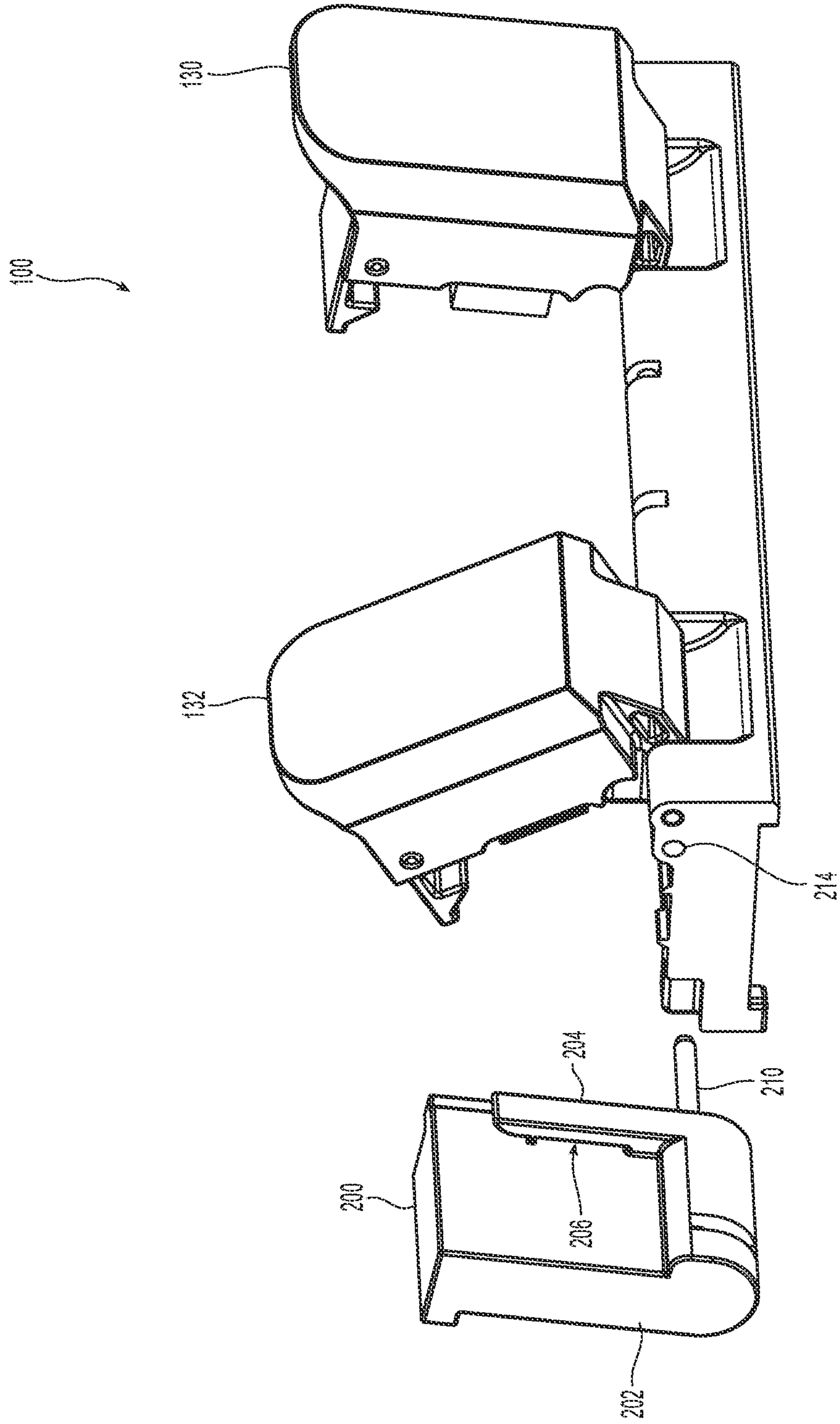
FIG. 11 is a perspective view from the front left corner of the fiber handling tool of FIG. 1 with a fiber stacker adjacent thereto.
Figure 13:
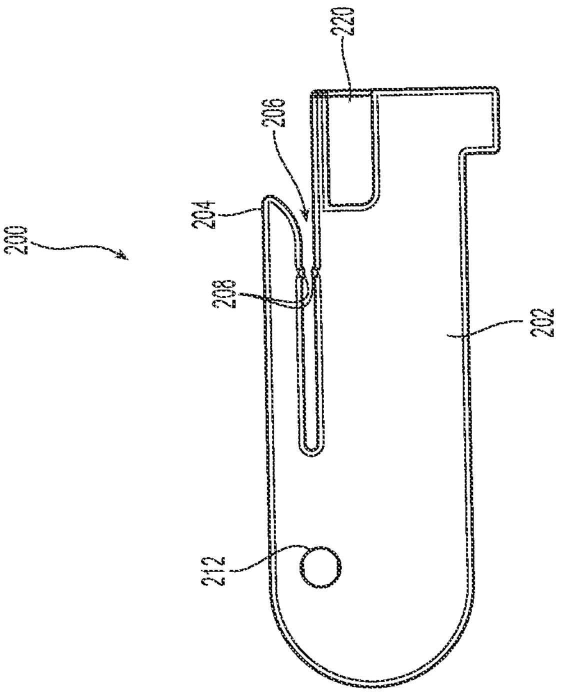
FIG. 13 is a side elevation view of the stacker in FIG. 11.
Figure 12:
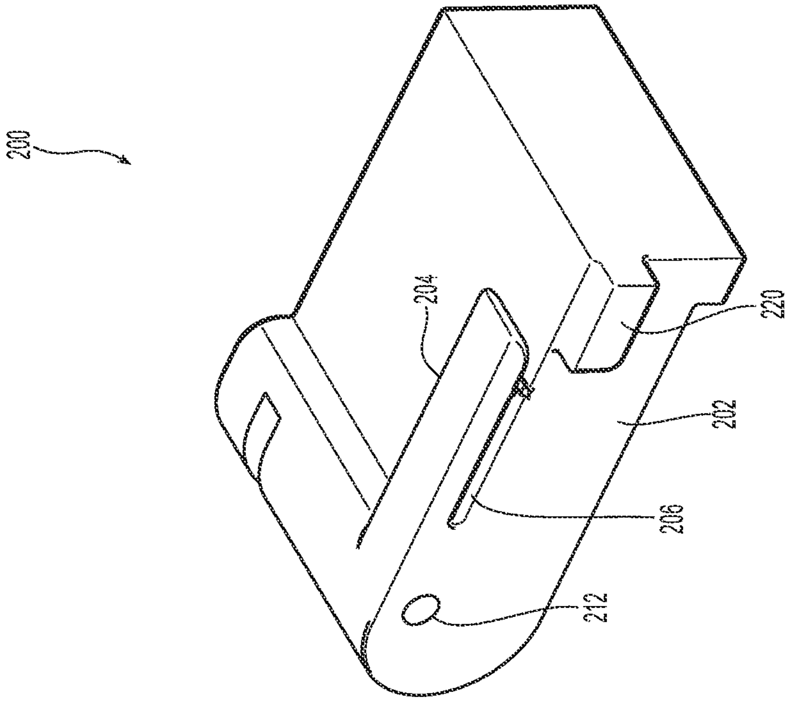
FIG. 12 is perspective view of the stacker in FIG. 11.

In FIG. 11, there is an optical fiber stacker 200 that can be used with the fiber handling tool 100. The optical fiber stacker 200 allows for the user to orient the optical fibers in order. Typically, the user will want to order the optical fibers based upon the color of the optical fibers. The fiber stacker has a base 202 and an arm 204 that have a space 206 therebetween. The space 206 is generally larger than the diameter of one optical fiber (125 microns) but smaller than twice the diameter (e.g., 250 microns). This spacing allows for the optical fibers to move within the fiber stacker 200, but not passed one another after the optical fibers are routed from the second portion 106 to the fiber stacker 200. Thus, the order is maintained by the fiber stacker. There may also be projections 208 on the base 202 and the underside of the arm 204 that narrow the space 206 to prevent the optical fibers from exiting the optical fiber stacker 200. See, e.g., FIG. 13. The optical fiber stacker 200 also has a stacker pin 210 that can be disposed in stacker pin hole 212. The stacker pin 210 also fits into a hole 214 in the base 102. The optical fiber stacker 200 rotates about the stacker pin 210 relative to the base 102. The optical fiber stacker 200 may also have a projection 220 that engages and rests on a surface 222 on the base 102. When the stacker pin 210 is in the stacker pin hole 212 and the hole 214 and is rotated about the pin and the projection 220 engages the surface 222, the optical fiber stacker is aligned with the second portion 106 to easily allow the optical fibers to be oriented and placed in the space 206.

A second embodiment of a fiber handling tool 300 is illustrated in FIGS. 15-19. In this embodiment, the base 302 is very similar to the base 102 discussed above in detail. The fiber handling tool 300 has a base 302 that includes a first portion 304 and a second portion 306. In one embodiment, the first portion 304 corresponds to a cable holding portion and the second portion 306 corresponds to an optical fiber holding portion. It may also have the pocket 308. The differences are the connections for the covers 330,332 with the base 302 and the optical fiber management structures that assist in keeping optical fibers that are not being terminated/ribbonized out of the way. In this embodiment, there is a fiber post 310 about which the optical fibers can be routed to keep them from being included in the fiber handling tool 300. It should be noted that there may be other differences in the bases 102/302. For example, the cable holding portions may be larger or smaller depending on the cables being terminated/ribbonized. The optical fiber holding portions may be wider or thinner, depending on the number of optical fibers being terminated/ribbonized or the size of the optical fibers.

The main difference in the two embodiments are the covers 330/332. As with the prior embodiment, the two covers 330/332 are the same and therefore only one will be discussed in detail. The covers 330/332 have a door lid 334 and a two-piece door lid latch 336. The door lid 334 is attached to a first side 338 of the base 302, while the two-piece door lid latch 336 is attached to a second side 340 of the base 302. The door lid 334 has a rear portion 342 to engage the base 302 in a rotatable manner. The door lid 334 has a cavity 346 to receive at least two elastic members 348,350. The elastic members 348,350 are preferably the same as in the prior embodiment 100. There may also be a separator 352 that is disposed between the two elastic members 348,350.

Figure 20:
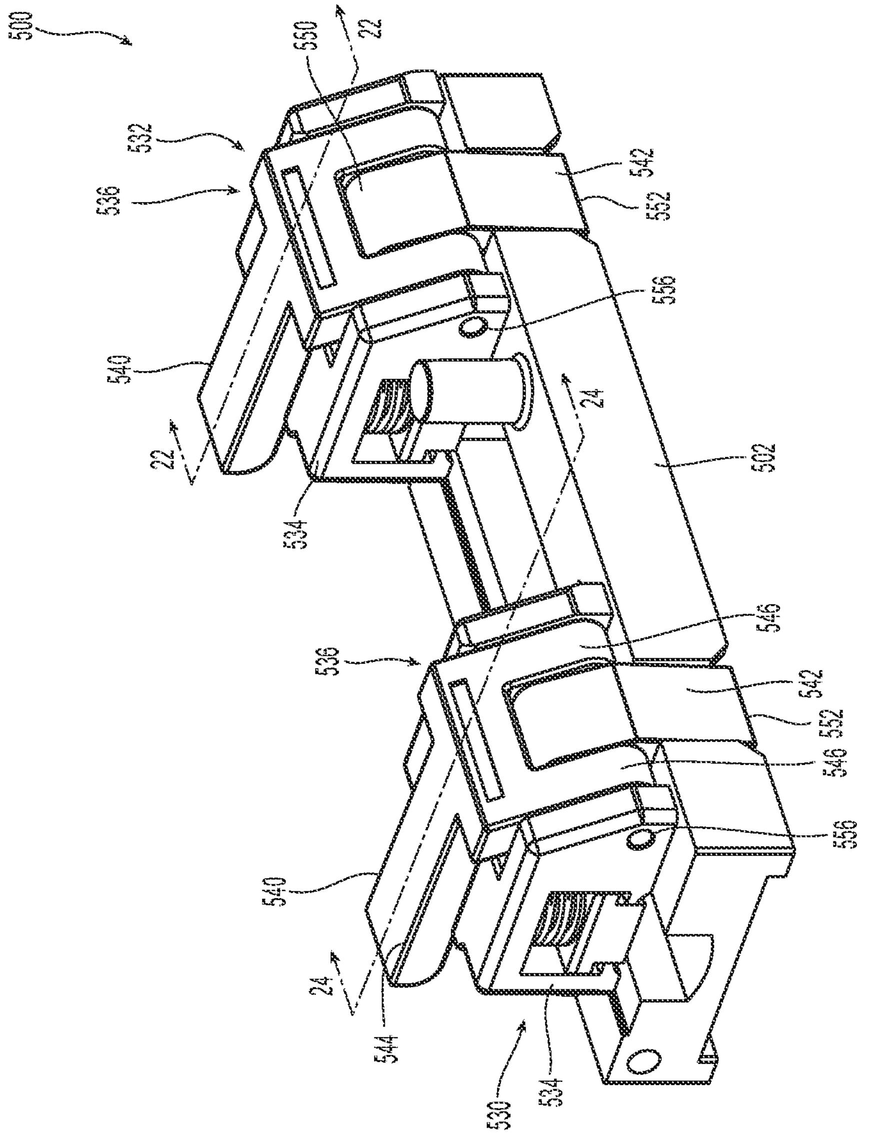
FIG. 20 is a perspective view from the right rear corner of a third embodiment of a fiber handling tool according to the present invention.
Figure 21:
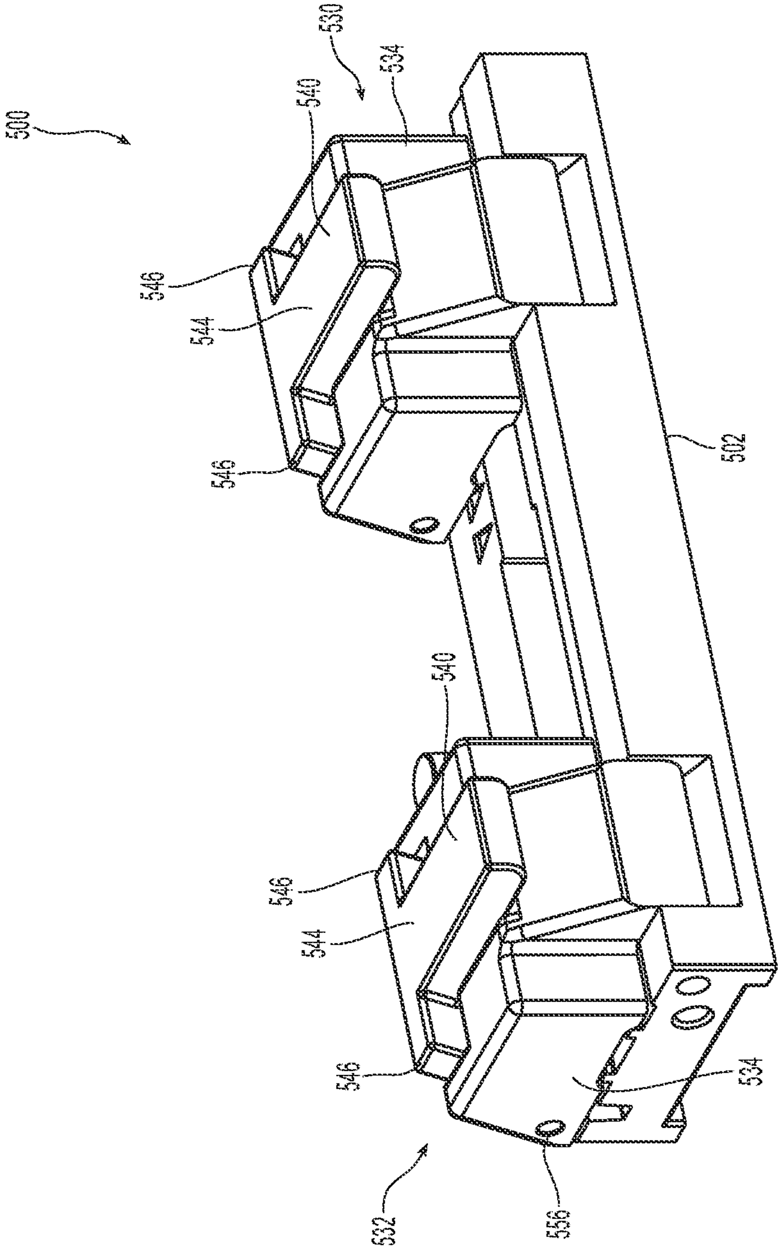
FIG. 21 is a perspective view of the fiber handling tool of FIG. 20.
Figure 22:
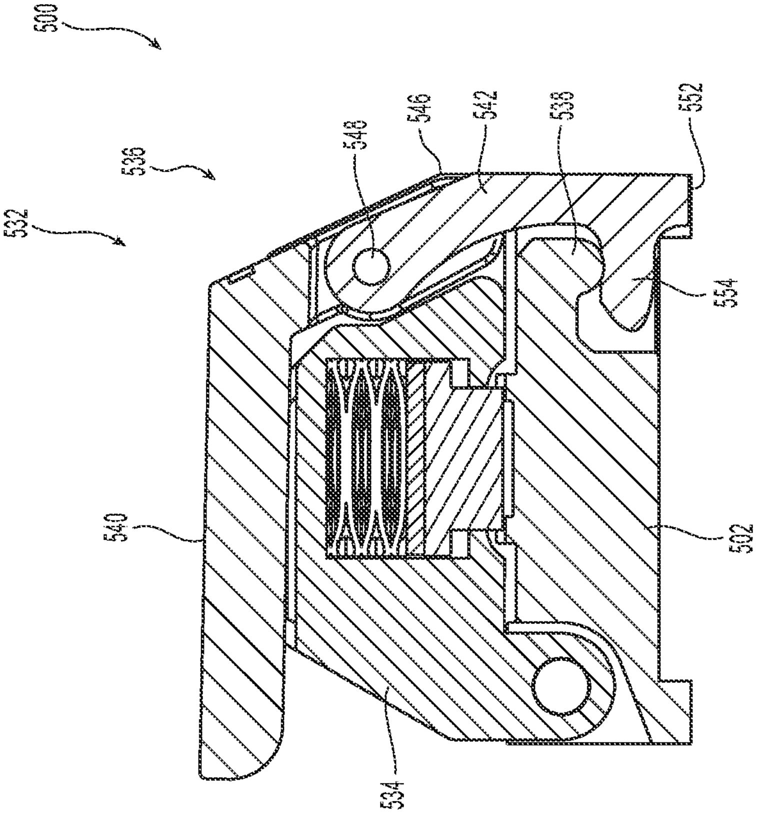
FIG. 22 is a cross section view of the fiber handling tool of FIG. 20 along the line 22-22.
Figure 23:
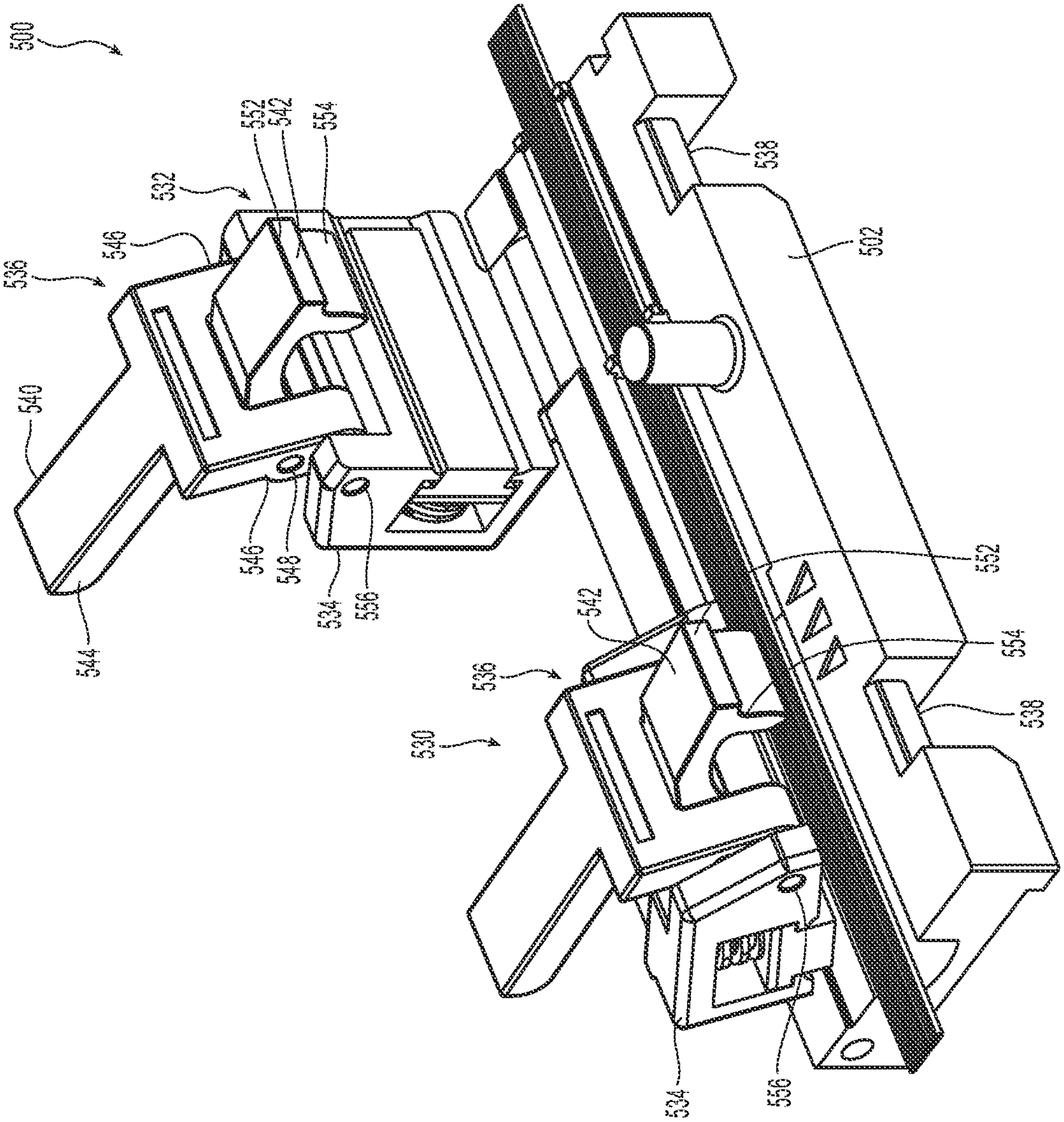
FIG. 23 is a perspective view from the back right corner of the fiber handling tool in FIG. 20.
Figure 24:
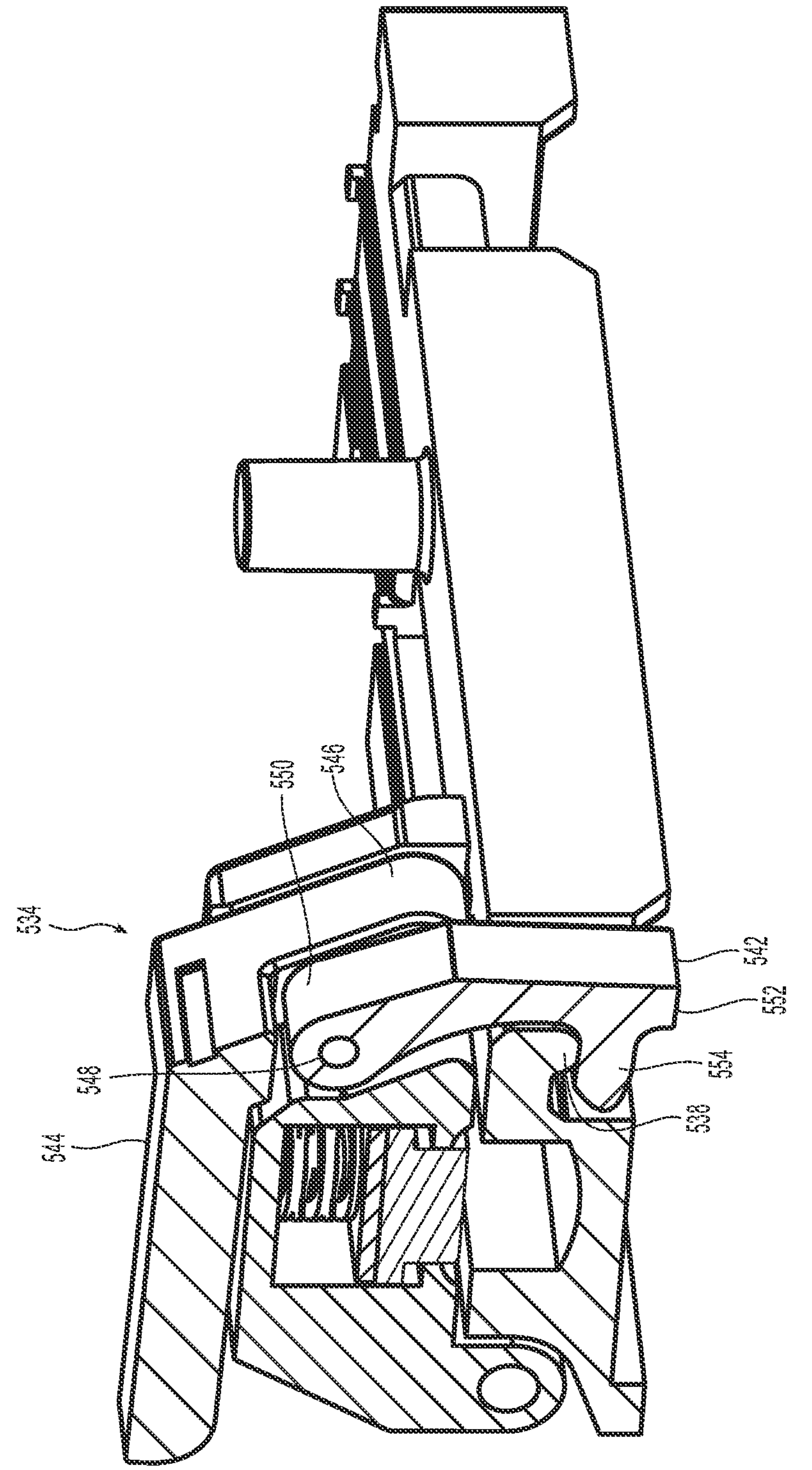
FIG. 24 is a cross section view of the fiber handling tool of FIG. 20 along the line 24-24.

The two-piece door lid latch 336 has a first piece 360, which is a lever arm, and a second piece 362, which is a base piece. The base piece 362 is rotatably connected to the base 302 at a first end 364, preferably by a pin through a hole 366. See FIGS. 15 and 18-19. The lever arm 360 is rotatably connected to the base piece 362 at a second end 368, again by a pin in a hole 374. See FIGS. 15 and 19. The lever arm 360 has a main portion 370 that connects to two leg portions 372 in the shape of an L. The legs portions 372 have a hole 374 to receive a pin from the base piece 362. Extending beyond the hole 374 are rounded portions 376 that, as explained in detail below, engage the door lid 344 to secure it over the optical fibers in the base 302. The door lid 334 has at the front portion 380 two curved surfaces 382. The two curved surfaces 382 correspond to the rounded portions 376 of the lever arm 360. To secure the two-piece door lid latch 336 to the door lid 334, the door lid 334 is moved over the base 302, and the rounded portions 376 of the leg portions 372 are aligned with the two curved surfaces 382. See FIG. 20. The user then uses the main portion 370 of the lever arm 360 to engage the rounded portions 376 of the leg portions 372 with the two curved surfaces 382. The main portion 370 is then rotated up and over the door lid 344 and into a recess 384 on the top of the door lid 334. The two-piece door lid latch 336 acts like a cam to secure the door lid 334 on the fiber handling tool 300.

A third embodiment of a fiber handling tool 500 is illustrated in FIGS. 20-24. The fiber handling tool 500, as with the fiber handling tool 300, differs mainly in the covers 530,532. The covers 530/532 have a door lid 534 and a two-piece door lid latch 536. The door lid 534 is attached to one side of the base 502, while the two-piece door lid latch 536 is attached to the door lid 534. However, there is an engagement surface 538 on the side of the base 502 opposite where the door lid 534 is attached for the two-piece door lid latch 536 to engage the base 502.

The two-piece door lid latch 536 has a lever arm 540 and a base piece 542. The lever arm 540 has a main portion 544 that connects to two leg portions 546 in the shape of an L. The leg portions 546 have two holes 548 to receive a pin from a top end 550 of the base piece 542 so they are rotatably connected. The base piece 542 extends from the top end 550 to the bottom end 552, where there is a projection 554 to engage the engagement surface 538 of the base 502.

In this embodiment, the door lid 534 is rotatably attached to the lever arm 540. The lever arm 540 connects to the front of the door lid 534 at the end of the two leg portions 546. See FIG. 23. The front of the door lid 534 has openings 556 to receive a pin from the lever arm 540, thereby rotatably connecting these two elements. To secure the covers 530/532, the door lid 534 is rotated over the base, the bottom end 552 and the projection 554 engage the engagement surface 538. The lever arm 540 is rotated back in the opposite direction, and in a cam-like fashion, the two-piece door lid latch 536 secures the door lid 534. See FIG. 24.

Figure 26:
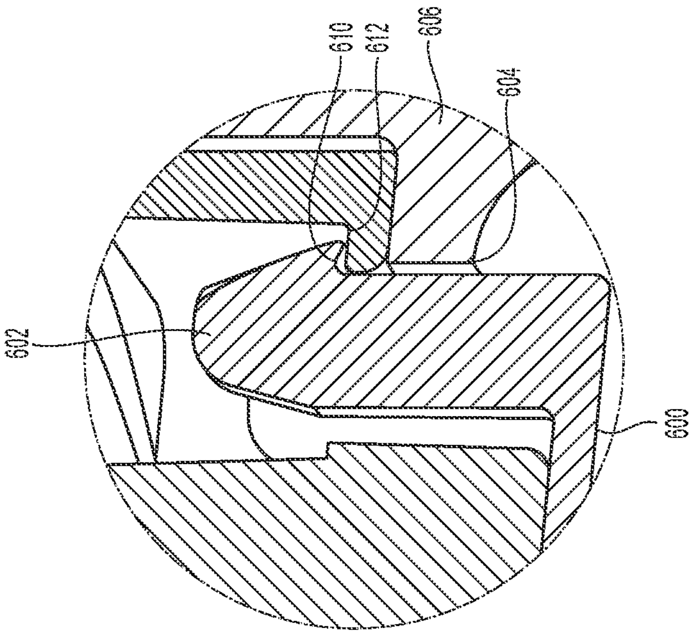
FIG. 26 is an enlarged portion of the cover in FIG. 25 showing the engagement of the elastic member to a separator.
Figure 25:
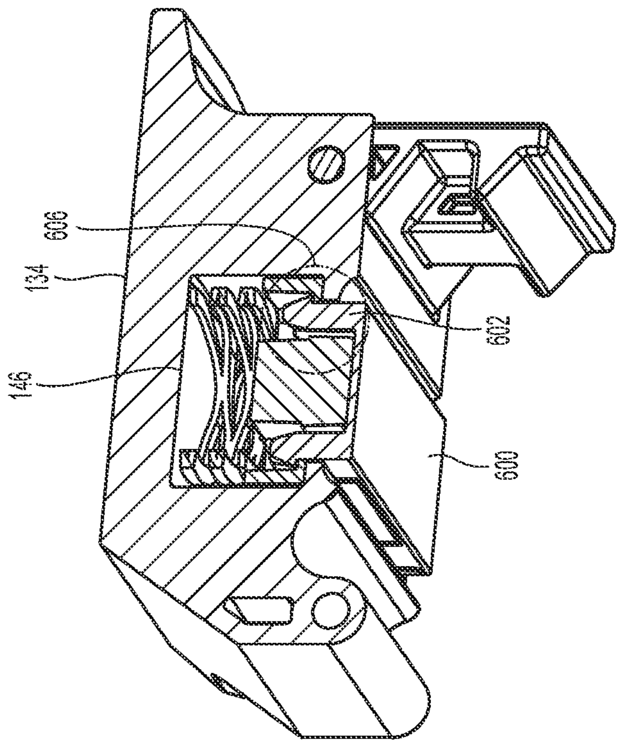
FIG. 25 is an alternative embodiment of a cover for the fiber handling tool of FIG. 1.
Figure 27:
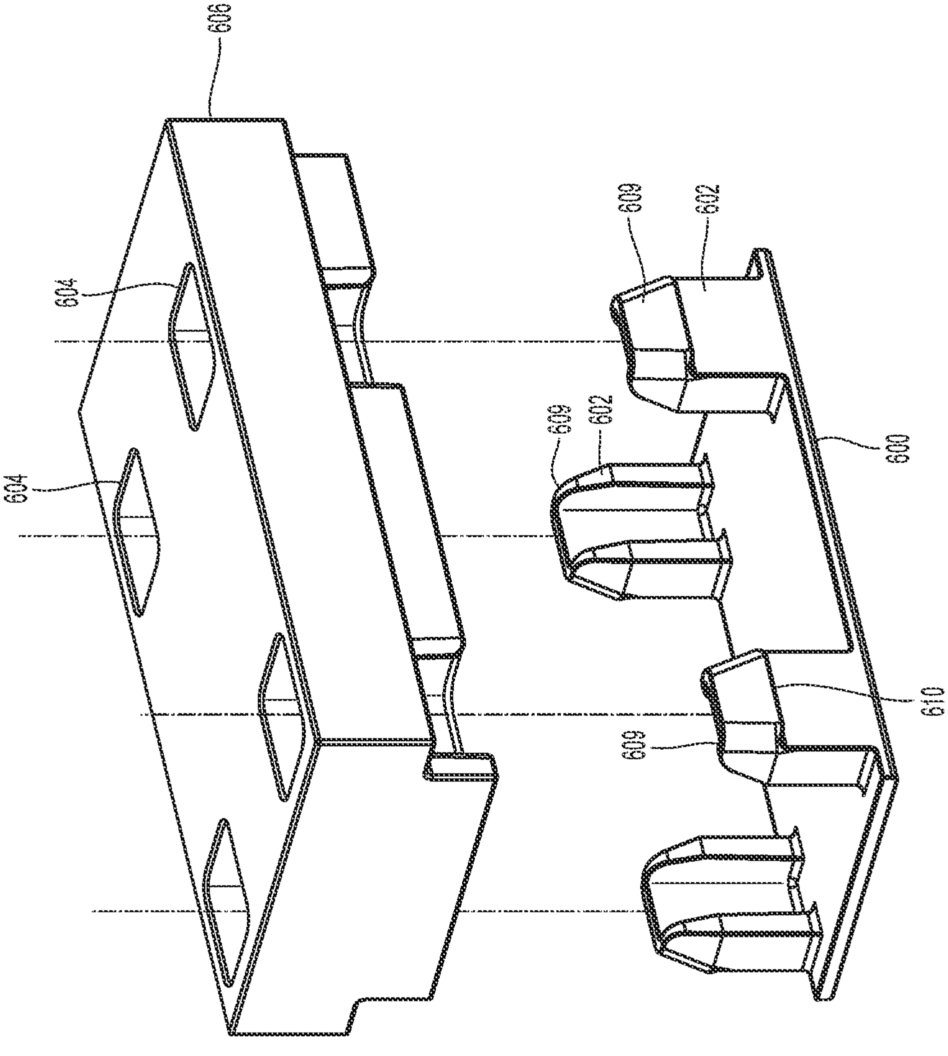
FIG. 27 is an exploded view of the elastic member and the separator of FIG. 26.

In an alternative to the two elastic members in the cavity of the covers, the second elastic member and the separator may have a more symbiotic relationship as illustrated in FIGS. 25-27. In FIG. 25 there is a main body 134 with a cavity 146. However, the second elastic member and the separator are different. As illustrated, the rubber pad or elastomeric material 600 has a number of pad bolts or extensions 602. These extensions 602 correspond to openings 604 in a separator 606. The separator 606 fits within the cavity 146 and may engage the first elastic member. The combination of the separator 606 and the rubber pad 600 will engage the optical fibers/cable in a fiber handling tool. The top end 604 of each of the extensions 602, there is hook or flat surface 610 that engages a corresponding flat surface 612 that extends into the openings 604 to secure the rubber pad 600 to the separator 606.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber handling tool for holding optical fibers relative to one another for preparation comprising:

a cable holding portion, the cable holding portion having a channel therein to receive a fiber optic cable having optical fibers disposed therein;

an optical fiber holding portion, the optical fiber holding portion configured to receive a single row of optical fibers from the fiber optic cable;

a first cover associated with the cable holding portion and having a first pad to engage the fiber optic cable disposed in the channel of the cable holding portion when the first cover is closed, and a first spring to bias the first pad towards the fiber optic cable, the first spring located between the first pad and an underside of the first cover; and a second cover associated with the optical fiber holding portion and having a second pad to engage the optical fibers disposed in the optical fiber holding portion when the second cover is closed, and a second spring to bias the second pad towards the optical fibers, the first pad being larger than the second pad.

2. The fiber handling tool according to claim 1, wherein the first cover has a main body, the main body has a door lock rotatably attached thereto, the door lock biased relative to the main body of the first cover by a third spring, and wherein the second cover has a main body, the main body has a door lock rotatably attached thereto, the door lock biased relative to the main body of the second cover by a fourth spring.

3. The fiber handling tool according to claim 2, wherein the cable holding portion and the optical fiber holding portion are on a base, the first cover and the second cover are rotatably attached to the base.

4. The fiber handling tool according to claim 3, wherein the base includes a pocket between the cable holding portion and the optical fiber holding portion.

5. The fiber handling tool according to claim 3, wherein the base includes a fiber management structure between the cable holding portion and the optical fiber holding portion, the fiber management structure configured to receive or to engage a portion of the optical fibers of the fiber optic cable.

6. The fiber handling tool according to claim 5, wherein the fiber management structure is a pathway.

7. The fiber handling tool according to claim 5, wherein the fiber management feature is a post.

8. The fiber handling tool according to claim 1, wherein the cable holding portion has a curved bottom.

9. The fiber handling tool according to claim 1, wherein the optical fiber holding portion configured to receive only a single row of the optical fibers is a groove.

10. The fiber handling tool according to claim 1, wherein the first cover and the second cover are connected to function as a single element.

11. The fiber handling tool according to claim 1, wherein the first cover and the second cover each have a rear portion, and wherein a rounded portion forward of a rear portion is provided to receive a rounded portion of a base to which the first cover and the second cover are attached.

12. The fiber handling tool according to claim 1, wherein the first spring and the second spring are each a conical spring.

13. The fiber handling tool according to claim 1, wherein the first pad and the second pad are each elastomeric.

14. The fiber handling tool according to claim 1, further comprising:

a first separator between the first spring and the first pad; and a second separator between the second spring and the second pad.

15. The fiber handling tool according to claim 1, wherein the first spring and the first pad are a single integrated piece, and wherein the second spring and the second pad are another single integrated piece.

16. The fiber handling tool according to claim 1, wherein the first pad and the second pad are movable relative to the first cover and the second cover, respectively.

17. A fiber handling tool for holding optical fibers relative to one another for preparation comprising:

a cable holding portion, the cable holding portion having a channel therein to receive a fiber optic cable having optical fibers disposed therein;

an optical fiber holding portion, the optical fiber holding portion configured to receive a single row of optical fibers from the fiber optic cable;

a first cover associated with the cable holding portion and having a first leaf spring structure to engage a fiber optic cable disposed in the channel of the cable holding portion when the first cover is closed, and to engage an underside of the first cover; and a second cover associated with the optical fiber holding portion and having a second leaf spring structure to engage the optical fibers disposed in the optical fiber holding portion when the second cover is closed, and to engage an underside of the second cover.

18. The fiber handling tool of claim 17, wherein each of the first leaf spring structure and the second leaf spring structure has a broad member directly contacting the fiber optic cable and the optical fibers, respectively.

19. The fiber handling tool of claim 17, wherein each of the first leaf spring structure and the second leaf spring structure has a smallest leaf spring directly contacting the underside of the first cover and the second cover, respectively.

20. The fiber handling tool according to claim 17, wherein the optical fiber holding portion configured to receive only a single row of the optical fibers is a groove.

* * * * *